United States Patent [19]

Botar

[11] Patent Number: 4,535,867
[45] Date of Patent: Aug. 20, 1985

[54] VERTICALLY INCLINED ENGINE LOW FLOOR BUS

[76] Inventor: Bela Botar, 10205 Collins Ave., Miami, Fla. 33154

[21] Appl. No.: 423,849

[22] Filed: Sep. 24, 1982

Related U.S. Application Data

[63] Continuation-in-part of Ser. No. 388,119, Jun. 14, 1982.

[51] Int. Cl.³ ............................................. B60K 5/00
[52] U.S. Cl. .................................. 180/294; 180/298; 180/312; 296/178
[58] Field of Search ............... 180/298, 294, 291, 292, 180/312, 55, 56, 59, 61, 213, 60, 68.1, 68.2, 69.9, 68.4; 296/178

[56] References Cited

U.S. PATENT DOCUMENTS

| 669,653 | 3/1901 | Morse | 180/298 |
| 1,078,308 | 11/1913 | Pfleider | 180/298 |
| 1,991,619 | 2/1935 | Mackenzie | 180/55 |
| 2,001,029 | 5/1935 | Kulick | 180/56 |
| 2,083,059 | 6/1937 | Fageol | 180/297 |
| 2,105,153 | 1/1938 | Ledwinka | 180/62 |
| 3,710,885 | 1/1973 | Brown | 180/294 |

FOREIGN PATENT DOCUMENTS 2019330 10/1979 United Kingdom ............... 180/298

Primary Examiner—Joseph F. Peters, Jr.
Assistant Examiner—Joseph G. McCarthy
Attorney, Agent, or Firm—Harvey B. Jacobson; Clarence A. O'Brien

[57] ABSTRACT

A vertically inclined engine low floor bus in which the prime mover for the bus is a rear engine oriented above the rear axle of the bus in a vertically inclined position with the transmission assembly being connected to the rear axle through a gear transfer case closely adjacent the front of the axle to enable the floor of the bus to be constructed at a lower position than arrangements in which the floor must be oriented vertically above the upper limits of movement of the rear axle assembly. Orienting the engine in this position also enables the overall height of the bus to be less than conventional while maintaining desired passenger compartment height and further enables the wheel base of the bus to be increased without increasing the overall length of the bus. The engine and transmission assembly are mounted on a sub-frame that is supported for downward swinging movement of the engine and transmission assembly to a generally horizontal position and longitudinal sliding movement thereof to a position projecting rearwardly from the bus to enable increased accessability to the engine and transmission assembly as well as the accessory components.

4 Claims, 3 Drawing Figures

VERTICALLY INCLINED ENGINE LOW FLOOR BUS

CROSS-REFERENCE TO RELATED APPLICATION

This application is a continuation-in-part of copending application Ser. No. 388,119 filed June 14, 1982 for VERTICALLY INSTALLED ENGINE FLOOR BUS.

BACKGROUND OF THE INVENTION

1. Field of the Invention

The present invention generally relates to bus structures and configurations and more particularly to a bus having an engine and transmission assembly oriented in vertically inclined relation above the rear axle and a low floor arranged forwardly of the rear axle with the rear axle being positioned closer to the rear end of the bus thereby increasing the wheel base of the bus without increasing the overall length thereof. This arrangement enables minimum overall height of the bus. The engine and transmission assembly is pivotally and longitudinally slidably supported on a subframe to enable the engine and transmission assembly to be pivoted downwardly to a horizontal and rearwardly extending position for accessability during repair, maintenance and the like, with the low floor configuration eliminating the necessity of multiple steps provided to enable passengers to board or exit from the bus.

2. Description of the Prior Art

Buses with rear engines are well known and in previously known bus configurations, the floor is oriented above the rear axle and at a position sufficiently above the rear axle to enable the rear axle to move in relation to the frame structure of the bus as occurs during normal operation. Various rear engine configurations have been employed such as engines mounted transversely at the rear of the bus in which the transmission is rather complicated and expensive and access to the engine is difficult since only one side thereof is exposed when a rear door is open and it is necessary to remove the rear seat and partition panel to gain access to the other side of the engine. Other arrangements have been provided in which the engine and transmission are separated and drivingly interconnected by a chain drive or the like with the engine and transmission being longitudinally oriented. In all of the previously known installations, the overhang of the rear portion of the bus as compared to the rear axle has been approximately at least two meters. Likewise, the floor of previously known buses has been oriented at a height usually no less than approximately 32 inches which requires two steps in order for passengers to gain access to the floor from street level. Various efforts have been made to provide vertically movable loading steps such as employed for handicapped people and the like and also so-called "kneeling" buses have been provided which are quite expensive and require considerable maintenance and have been less than completely successful.

SUMMARY OF THE INVENTION

An object of the invention is to provide a low floor bus configuration driven by an engine oriented in a longitudinal, vertically inclined position above the rear axle, thereby enabling the rear axle to be moved rearwardly in relation to the bus thereby facilitating an increase in the wheel base of the bus without any increase in the overall length of the bus and reducing the overall height of the bus while maintaining desired passenger compartment headroom.

A further object of the invention is to provide a bus in which the floor is located forwardly of the rear axle and at an elevation at or below the rear axle.

Another object of the invention is to provide a low floor bus in accordance with the preceding object in which the engine and transmission assembly associated therewith is supported from a sub-frame pivotally and slidably attached to the bus structure to enable a winch or other mechanism to raise and lower the engine so that it can be oriented horizontally and then slid longitudinally at the rear of the bus for projecting rearwardly therefrom to facilitate accessability to the engine for maintenance and repair.

A still further object of the invention is to provide a low floor bus in accordance with the preceding objects in which the increase in the wheel base without increase in overall length will increase stability of the bus by positioning the engine weight directly over the rear axle at the center thereof with the lower floor reducing the height of the passenger load.

Still another object of the invention is to provide a low floor bus as set forth in the preceding objects in which the engine and associated components can be effectively surrounded by insulation to reduce noise emission and the engine and bus configuration is provided with an air intake in the top of the bus rather than at the lower rear sides thereof as in present day construction thereby providing a flow of air which flows downwardly around the engine, transmission, axle and other components to provide for air cooling and to eliminate intake of dirt and dust which occurs with the present day structures in which the air intakes are located immediately rearwardly of the rear wheels.

Still another important object of this invention is to provide a low floor bus configuration as defined in the preceding objects in which the various accessories, such as batteries, air tanks, fuel tanks, and the like can be more effectively located within the engine compartment with efficient space utilization eliminating present day staggered and inaccessible orientation of these components. In addition, the engine and transmission assembly and transfer case may be standard components rather than specially constructed and expensive transmissions such as normally employed on buses and the movement of the engine will not require disconnecting or removal of any lines or cables inasmuch as they will be flexible across the pivotal and slidable connection and the drive line will include a separable connection to a gear transfer case positioned forwardly of the rear axle or intermediate the axles when used with a tandem axle assembly. This engine installation is also advantageous in a bus in which the floor is not lowered, especially in long distance buses, by increasing the stability due to an increase in the wheelbase without increasing the overall length. All of the other advantages mentioned previously would still occur in this type of installation. Also, the increased wheelbase provides additional luggage storage space for intercity buses with the luggage space also being lowered to increase stability.

These together with other objects and advantages which will become subsequently apparent reside in the details of construction and operation as more fully hereinafter described and claimed, reference being had to

DESCRIPTION OF THE PREFERRED EMBODIMENT

Figure 1:
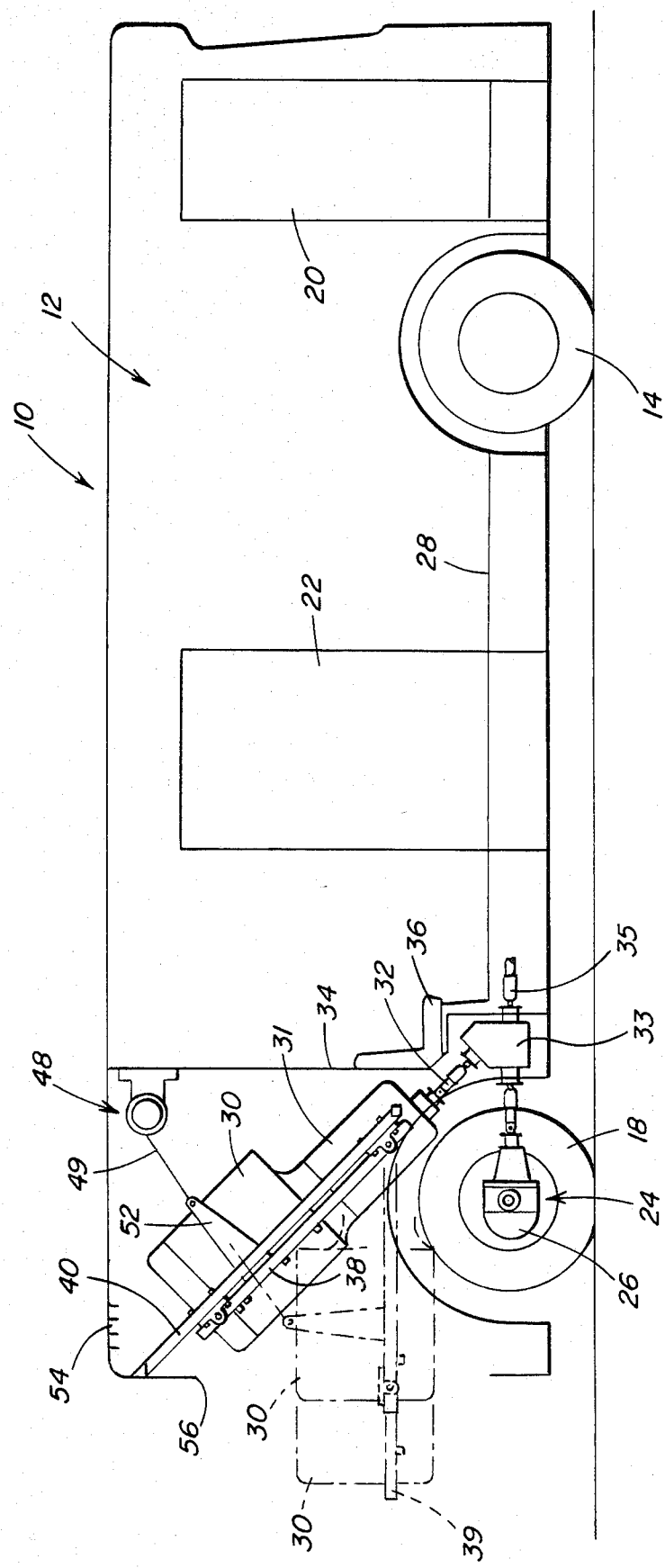
FIG. 1 is a schematic side elevational view of the vertically inclined engine low floor bus configuration of the present invention.

Referring now specifically to the drawings, the vertically inclined engine low floor bus of the present invention is generally designated by reference numeral 10 and includes a bus body 12 provided with front steerable wheels 14, rear driving wheels 18, a front door 20 and a rear door 22, all of which are of conventional construction. In the construction of the present invention, the rear drive wheels 18 are interconnected by an axle assembly 24 including a differential housing 26 which has been shifted to the rear of the body 12 as compared to conventional construction without increasing the overall length of the body 12 so that the wheel base of the bus 10 has been increased without increasing the overall length thereof and the rear overhang of the bus, that is, the distance between the rear axle 24 and the rear of the body 12 has been decreased. In view of this orientation of the axle 24, the floor 28 of the body 12 can be lowered to a point adjacent or below the centerline of the wheels and axles as illustrated in FIG. 1 inasmuch as the floor 28 terminates forwardly of the rear axle 24 with the floor, which can be in the same plane throughout its length, being oriented approximately 20 inches from the ground surface as compared to a standard 32 inches. In order to move the rear axle 24 rearwardly in relation to the remainder of the body 12, a slanted or vertically inclined engine 30 and transmission assembly 31 is connected to the rear axle 24 for driving the same in a conventional manner through a short drive shaft 32 and a gear box or transfer case 33 so that conventional engine and transmission components can be employed. The drive shaft 32, the engine crankshaft and shaft components of the transmission are generally inclined at about 45° and extend above as well as to the front and rear of the rear axle 24 as illustrated in the drawings. With this arrangement, the overall height of the bus body 12 can be maintained at a minimum for increased stability, less frontal area and wind resistance and reduced possibility of contact with overhead obstructions. A rear wall 34 is provided in the body 12 which can be insulated to the extent that no access is necessary through the rear wall 34 to the engine. The rear seat assembly 36 is disposed forwardly of the rear wall 34 and supported from the floor 28 in a conventional manner. With the unique inclined engine and rear axle assembly of this invention, there is no necessity to remove the rear seat 36 and remove panels from the rear wall 34 to gain access to the engine assembly since the engine assembly will pivot from the position illustrated in full line in FIG. 2 to the generally horizontal position illustrated in broken line in FIG. 2 and then slid rearwardly to provide easy access thereto in a manner set forth hereinafter.

Figure 2:
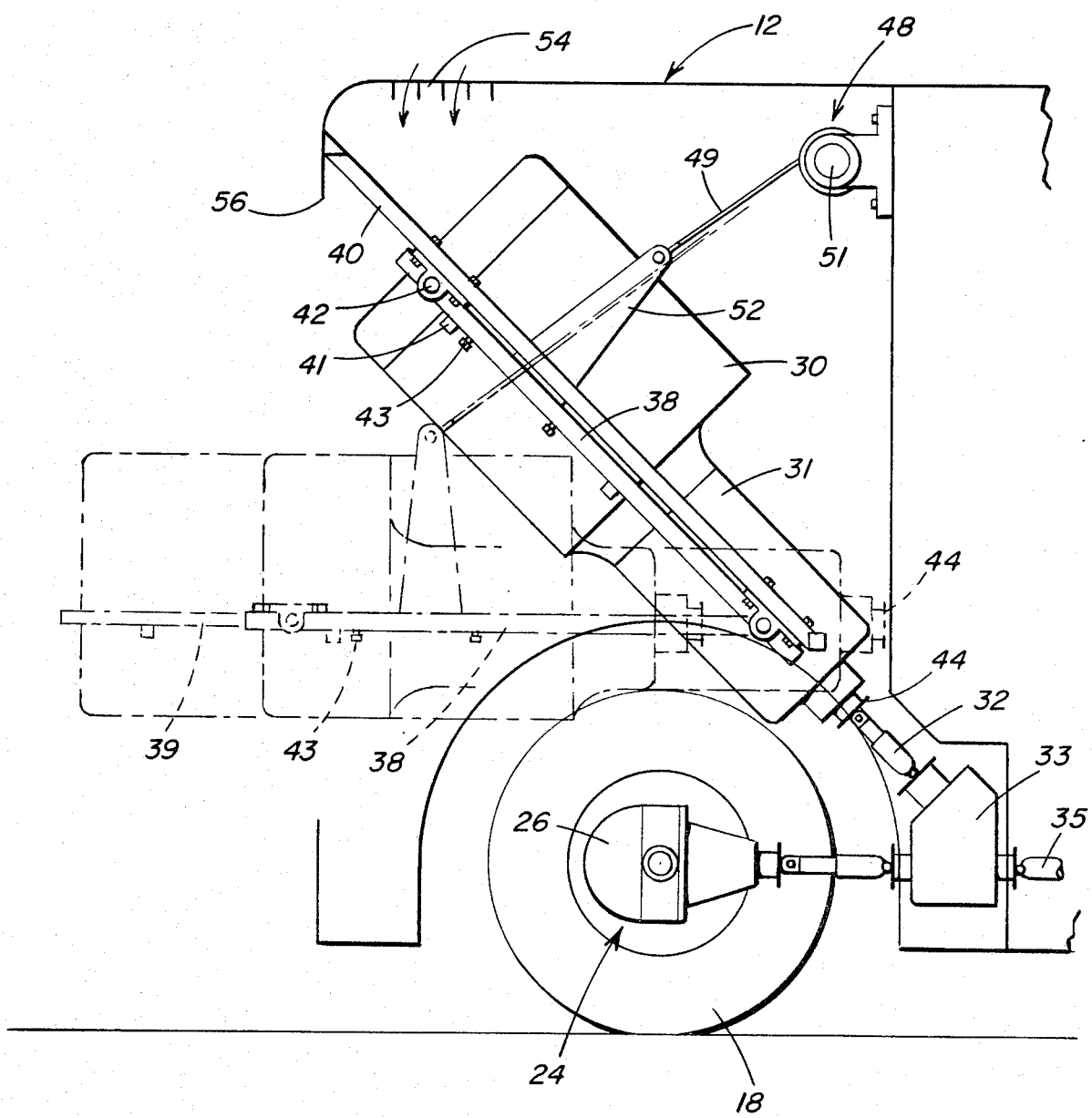
FIG. 2 is a enlarged schematic elevational view of the rear end portion of the low floor bus.
Figure 3:
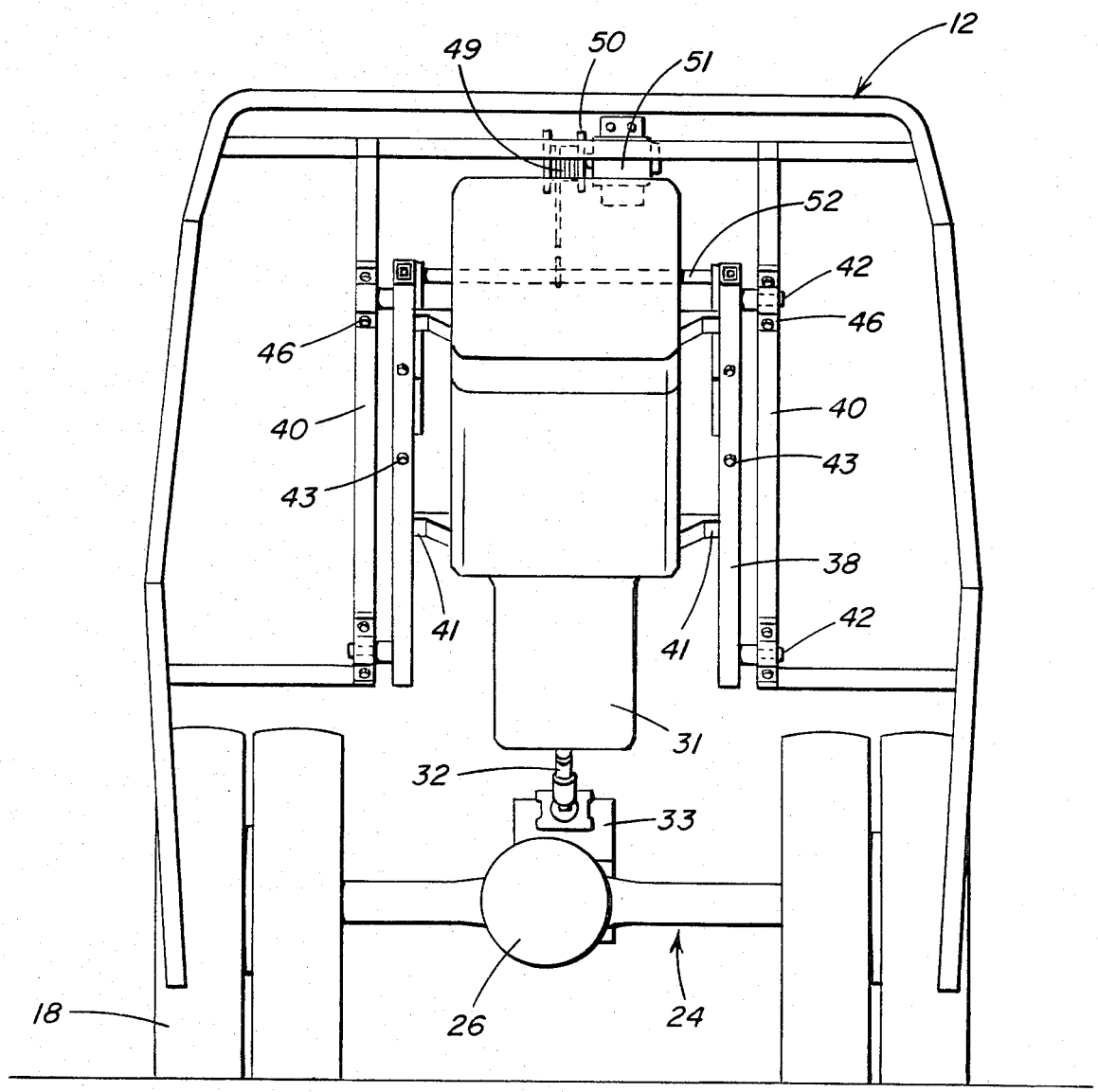
FIG. 3 is a schematic rear end elevational view illustrating the relationship of the components of this invention.

The engine 30 and transmission assembly 31 is supported from a sub-frame 38 having its ends connected to a supporting frame 40 by stub shafts 42 which may be cushioned in rubber bushings so that the sub-frame 38 and engine and transmission assembly can pivot about a horizontal axis defined by the stub shafts 42 at the lower forward end of the sub-frame 38 with a separable flanged joint 44 being provided in the drive shaft 32 to enable movement of engine 30 to its horizontal position. The upper stub shafts 42 on the sub-frame 38 are connected to the frame 40 by a plurality of bolts such as bolts 46 which may be oriented with two bolts on each side so that by removal of four bolts, the engine and transmission assembly can be pivoted to the horizontal position. A winch 48 which may be either manual or power driven interconnects the frame and the sub-frame to facilitate movement of the engine and transmission assembly from the generally 45° vertically inclined position to the generally horizontal rearwardly projecting position in which a major portion of the length of the engine and transmission assembly projects longitudinally from the rear of the bus as illustrated in FIG. 2. The sub-frame 38 also includes telescopically slidable side members 39 supporting the engine 30 by engine mounts 41 which extend through slots or the like in sub-frame 38, as shown in FIG. 2, releasably locked in place by bolts 43 to enable the engine 30 to be slid rearwardly thereby providing effective accessability to all components of the engine and transmission as compared with the necessity of leaning forwardly into an engine compartment or gaining access through the rear wall as necessary in conventional rear engine buses. The winch 48 is provided with a suitable cable or cables 49, a winchdrum 50 and motor 51 or hand crank capable of raising or lowering the engine and transmission assembly with the sub-frame 38 having a bracket 52 including a cross member to which cable 49 is connected. With this arrangement, it is only necessary to remove the bolts 46 and lower the engine and slide it rearwardly to enable it to be easily repaired, maintained or the like, and all fuel lines, air lines, battery cables, control devices and the like will be flexible so that they may connect with the engine and transmission assembly and need not be disconnected when the engine and transmission assembly is pivoted from its operative vertically inclined position to its horizontal rearwardly projecting maintenance position.

The bus body 12 includes an air inlet louver arrangement or grille 54 so that the engine radiator, fan and the like can be associated with the engine and transmission assembly and the air inlet for cooling the engine. The inlet air will pass downwardly around the engine and transmission assembly and be discharged at the lower end thereof to not only provide effective cooling of the engine and associated components but also eliminate the problem of dirt and dust being picked up by the air cooling system as occurs with present day structures in which the air inlet is adjacent the rear lower side portions of the bus body. The rear compartment in which the engine is located is provided with an access opening 56 that will be provided with a hinged door or the like of conventional construction.

By orienting the rear axle rearwardly and providing the vertically inclined engine and transmission assembly, the wheel base of the bus can be increased in relation to its overall length without increasing the overall length of the bus and increased engine accessability is obtained when the engine is pivoted and moved rearwardly to the horizontal rearwardly extending maintenance position. With this arrangement, the roof of the body 12 does not have any upward projections and can be lowered to reduce overall height while maintaining adequate headroom in the passenger compartment. Also, the floor can be oriented forwardly of the rear axle and thus is not limited to an elevation above the upper limits of movement of the rear axle as in conventional construction thereby enabling the floor to be lowered to a position as close as 20 inches or less from the ground with, of course, sufficient road clearance being maintained to maneuver over streets, roads and the like. This arrangement increases stability for small and medium-sized buses by obtaining longer wheel bases without increasing the overall length and the structure of the engine compartment enables sound attenuating insulation to be installed completely around the engine and related components. The air intake provides a downward flow of air around the engine, transmission, axle, and the like to provide external air cooling around all of these components and eliminates entrainment of dust, dirt and the like as occurs with present day lower side air intakes. All major components and accessories such as batteries, air tanks, fuel tanks and the like needed for the operation of the bus can be located within the engine compartment to provide efficient space utilization thereby eliminating the staggered and difficult installation and servicing as presently used. This arrangement permits quick and immediate access for maintenance and repair to the engine and transmission by removing or loosening bolts thereby enabling the sub-frame, engine and transmission to be pivoted and slid to a horizontal, rearwardly extending position with this movement of the engine and transmission not requiring the disconnection or removal of various fuel lines, air lines, electrical cables, control devices and the like which will include flexible components so that they may pivot or swing as the sub-frame pivots and slides. Luggage compartment spaces can be increased in intercity buses due to the longer wheel base without any increase in the overall length of the bus and lowering the position of the weight of the luggage and reduction in overall height increases stability along with the increase in stability caused by lowering of the floor and orienting of the engine centrally over the rear axle. This construction also enables standard engine, transmissions and other components to be used with only minor modification required to enable dependable long lasting operation when vertically inclined thereby eliminating the need of large, specially designed and expensive gear boxes or other power transfer cases such as employed in present constructions when the rear overhang has been attempted to be shortened. The gear box 33 is a conventional structure in which the input shaft 32 is oriented in 45° angular relation to the output shaft which connects with the differential or output shafts when oriented between tandem driven axles. When installed in a bus with tandem drive axle assemblies, the transfer case 33 is provided with a forwardly projecting output shaft 35 for connection with the different assembly in the forward tandem axle assembly (not shown).

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A vertically inclined engine bus comprising a bus body having front steerable wheels and rear drive wheels interconnected by a drive axle assembly, a floor, and drive motor and transmission means connected to the drive axle assembly, said drive, motor and transmission means being disposed in vertically inclined position above the drive axle assembly thereby enabling the drive axle assembly and rear wheels to be oriented closer to the rear of the body and increasing the wheelbase without increasing the overall length of the bus, said body having a rear wall providing a partition between the rear of the floor and the compartment receiving the drive motor and transmission means, said floor being disposed in a single plane and extending forwardly from the rear axle assembly and positioned in a horizontal plane below the upper limit of movement of the drive axle assembly whereby the floor may be positioned closer to the ground surface, and a rearmost seat assembly affixed to the body forwardly of the rear wall in a manner eliminating access to the rear engine compartment through said partition provided by the rear wall, said drive motor and transmission means being supported from a sub-frame, means pivotally supporting the lower end of the sub-frame from the body to enable the drive mtor and transmission means to swing down and slide rearwardly to a generally horizontal position extending rearwardly longitudinally of the body for easy access to all areas of the drive motor and transmission means, said sub-frame being retained in upwardly extending position by removable fastener means adjacent the upper end thereof, winch means for raising and lowering the sub-frame, drive motor and transmission means about a transverse axis defined by the pivotal support means.

2. The bus as defined in claim 1 wherein said body has air intake means adjacent the upper surface thereof to enable clean cooling air to be circulated downwardly over the drive motor and transmission means for discharge at a lower point to eliminate entrainment of dust and dirt into the cooling air as occurs when the air intake means is at the rear lower portion of the bus.

3. In a bus having an elongated body with front steerable wheels, rear drive wheels, a rear drive motor and transmission assembly drivingly connected to the rear drive wheels, a floor extending lengthwise of the body for supporting a plurality of seats, the improvements comprising a rear wall in the bus body to isolate the drive motor and transmission assembly from the space above the floor, the area of the body rearwardly of the rear wall forming a compartment for the drive motor and transmission assembly, means supporting said drive motor and transmission assembly in said compartment at an incline with the longitudinal center of the drive motor and transmission assembly being in alignment with the longitudinal centerline of the body, said rear drive wheels being interconnected by a transverse axle assembly oriented in underlying spaced relation to the drive motor and transmission assembly, said axle assembly being drivingly connected to a gear box disposed forwardly of the axle assembly and below and forwardly of the lower forward end of the transmission assembly with the output of the drive motor and transmission assembly including a drive shaft forming an input into the gear box and a drive shaft interconnecting an output of the gear box and an input of the axle assembly, said means supporting said drive motor and transmission assembly comprising a sub-frame having the drive motor and transmission assembly mounted thereon, means pivotally supporting the lower forward end of the sub-frame from said compartment for pivotal movement in a vertical plane between a generally horizontal position and the inclined position, means releasably securing said drive motor and transmission assembly in the inclined position, means to move said sub-frame between its two positions, and means enabling longitudinal movement of the drive motor and transmission assembly when in horizontal position to a position projecting rearwardly from the compartment to increase accessibility thereto without disturbing the gear box and axle assembly, said floor being disposed in a single plane oriented below the upper limit of movement of the axle assembly and forwardly of the rear wheels to enable a maximum wheelbase without increasing overall length of the bus.

4. The bus as defined in claim 3 wherein said drive motor and transmission assembly, gear box and rear axle assembly are separate and independent components, the axis of pivotal movement of the sub-frame being spaced above and forwardly of the rear axle assembly, said means to move said sub-frame including a winch mounted in the compartment and operatively connected with the sub-frame at a point spaced rearwardly from the axis of pivotal movememt of the sub-frame.

* * * * *